Aug. 18, 1959 — T. R. SMITH — 2,899,817
VARIABLE LIQUID LEVEL CONTROL
Filed Aug. 13, 1953 — 3 Sheets-Sheet 1

Inventor
Thomas R. Smith
by J. K. Moser
Agent

Aug. 18, 1959 T. R. SMITH 2,899,817
VARIABLE LIQUID LEVEL CONTROL
Filed Aug. 13, 1953 3 Sheets-Sheet 2
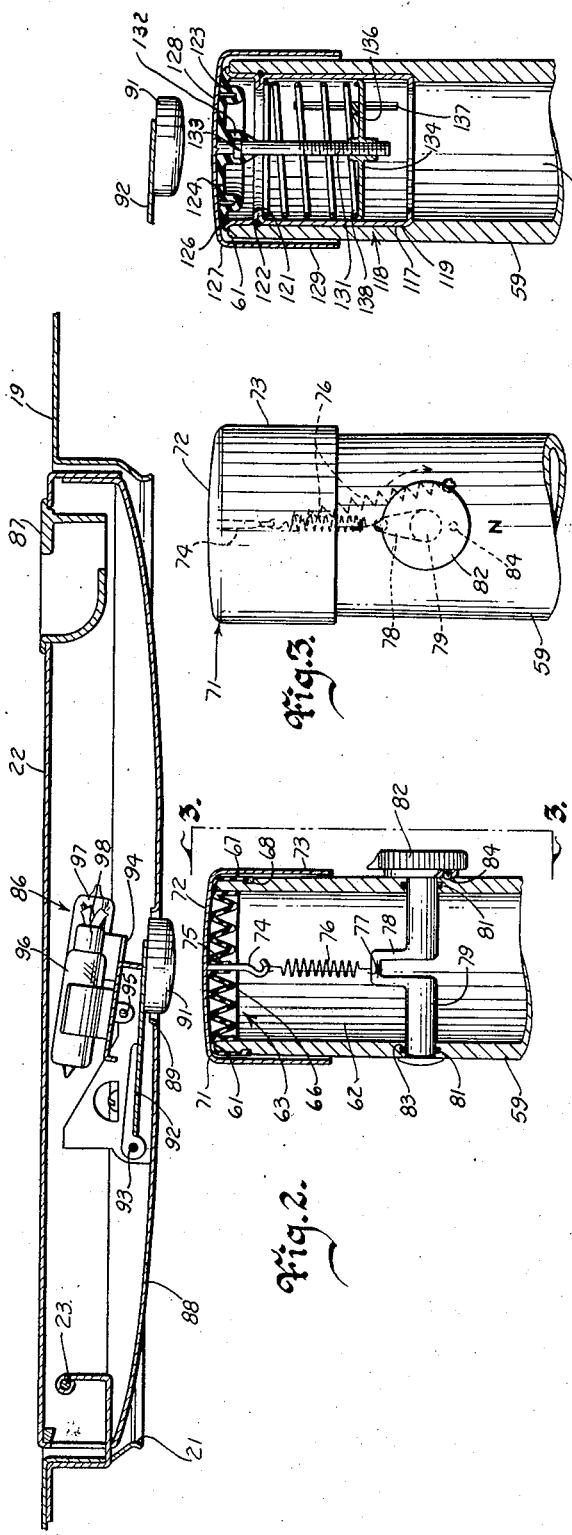
Inventor
Thomas R. Smith
by J. K. Moser
Agent

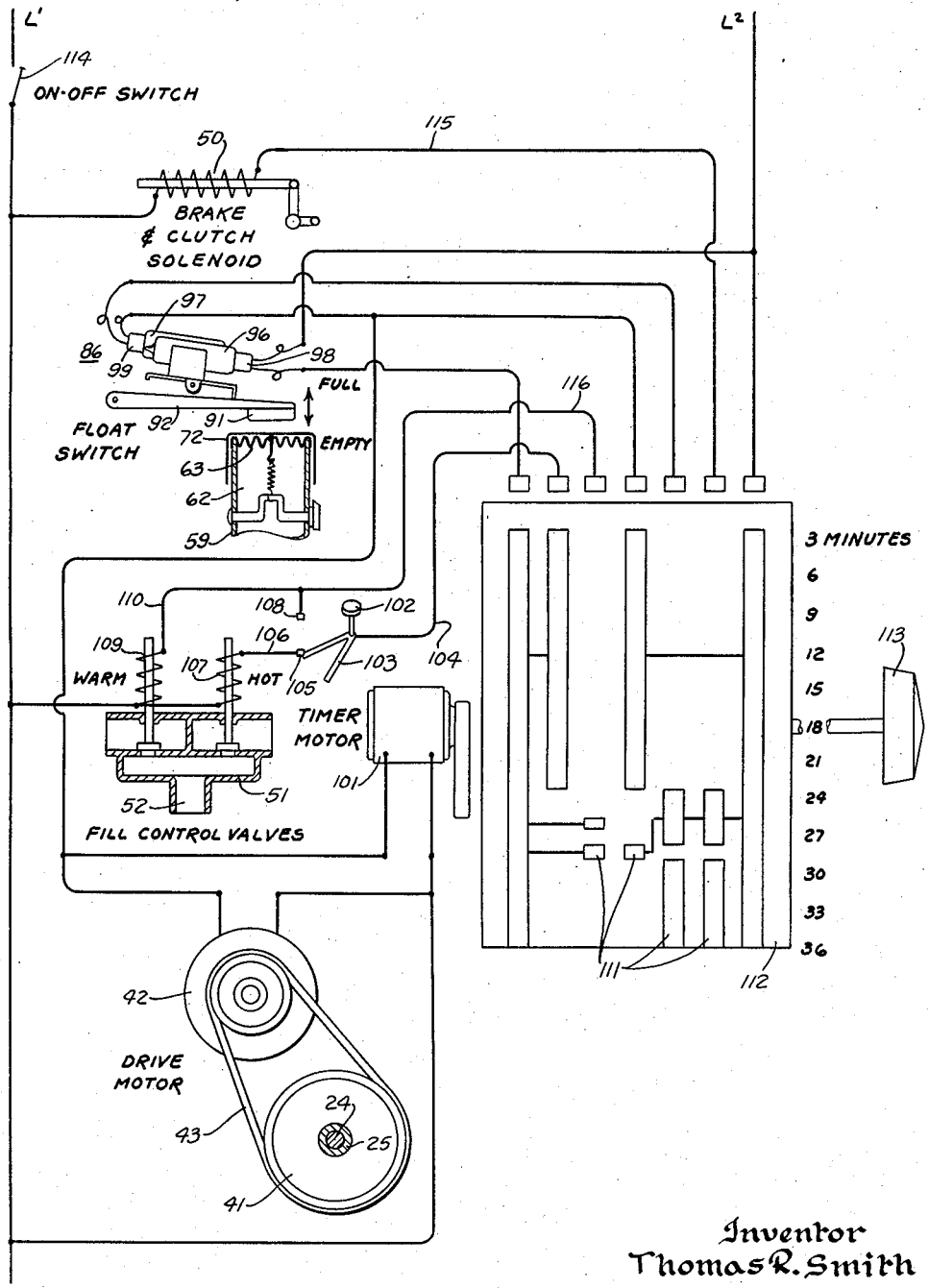

United States Patent Office 2,899,817
Patented Aug. 18, 1959

2,899,817

VARIABLE LIQUID LEVEL CONTROL

Thomas R. Smith, Newton, Iowa, assignor to The Maytag Company, Newton, Iowa, a corporation of Delaware Application August 13, 1953, Serial No. 373,957

3 Claims. (Cl. 68—133)

The invention relates to control apparatus and more particularly to control apparatus for a washing machine for initiating a washing operation at various liquid levels.

It is one of the objects of the invention to provide a simplified means for modifying liquid level responsive mechanism for washing machines whereby the operator may readily manipulate mechanism to selectively control the level at which the liquid in the washing machine initiates the washing operation to accommodate for different quantities of fabrics to be washed.

Heretofore in automatically operated washing machines of the vertical axis type, it has been difficult to provide an effective control means which may be readily adjusted to respond at varying selected liquid levels within the tub for washing different quantities of clothes for both the washing and rinsing operations. While various means have been suggested in the form of manually operable switches and the like, most of these suggestions require the operator to remain at the machine and personally observe and estimate the desired liquid level. At times this is inconvenient and there is always the possibility of the operator's estimate of the proper quantity of liquid will be erroneous, with the result either too much or too little liquid will be supplied for the proper washing. In addition, the operator must either observe the proper liquid level for the rinsing operation, or the rinsing operation is carried out with the normal full load quantity of water. Other means including additional float switches and the like have also been suggested to provide for automatic operation at different levels, however, the use of additional floats, switches and extra circuits increases the complication and the overall cost of the apparatus.

In accordance with the invention a washing machine having a tub rotatable about its vertical axis is provided with an oscillatory agitator therein and a cover or lid is mounted above the tub to cover the same. The agitator includes an imperforate body portion with an upwardly extending hollow center post communicating with the tub adjacent the bottom thereof. The upper end of the center post is sealed by means of a liquid level sensitive mechanism which is responsive to the liquid level within the tub and capable of transmitting a force corresponding to the level to switch mechanism mounted in the lid. This switch mechanism when actuated, interrupts the flow of liquid to the tub and causes the washing machine to operate in a predetermined sequence to wash and rinse the clothes to be treated.

Since the level of the liquid has a direct effect on the liquid level sensitive mechanism for actuating the switch means, means are provided to bias or load the liquid level sensitive mechanism so that its response may be readily varied. In this form either an adjustable spring load or weighted member mounted adjacent the liquid level sensitive mechanism is adapted to bias or load the same to oppose the pressure developed by the head of liquid within the tub. In this manner the movement of the liquid level sensitive mechanism may be controlled so that it will contact and actuate the control switches when the selected liquid level is reached in the tub. By providing a simplified loading means the operator need but make a relatively simple adjustment at one location at the time the fabrics are inserted in the tub which will automatically establish the level of liquid therein at which the washing cycle will be automatically started and followed through for both the washing and rinsing operations.

It is, therefore, another object of the invention to provide a washing machine with liquid level responsive mechanism which is selectively loaded to provide for a multiplicity of selected liquid levels within the washing machine at which the washing operation is initiated.

It is another object of the invention to provide a washing machine of the vertical axis type with an adjustable liquid level responsive mechanism which responds at various selected liquid levels within the tub to actuate control mechanism for initiating the operation of the washing machine and to terminate the supply of liquid thereto.

It is still another object of the invention to provide a washing machine having a tub rotatable about its vertical axis and an agitator therein having a hollow center post carrying a liquid level sensitive member thereon which is manually adjustable to vary its response to the liquid level in the tub to actuate a control switch for initiating the washing operation and terminating the supply of liquid at different selected liquid levels corresponding to different quantities of fabrics to be washed.

Other objects, features, capabilities and advantages are comprehended by the invention as will later appear and as are inherently possessed thereby.

Referring to the drawings:

Figure 2 is a partial enlarged vertical sectional view of the liquid level responsive means shown in Figure 1;

Figure 3 is a vertical elevational view of the liquid level responsive means taken along the line 3—3 of Figure 2;

Figure 4 is a view similar to Figure 2 showing a modified construction for the liquid level responsive means;

Figure 5 is a partial vertical sectional view showing a further modified arrangement showing a removable weighted member for loading a liquid level responsive member;

Figure 6 is a view similar to Figure 5 showing a weighted member of a larger size; and Figure 7 is a schematic wiring diagram for a washing machine of the automatic type to which the pressure responsive means would be applicable.

Figure 1:
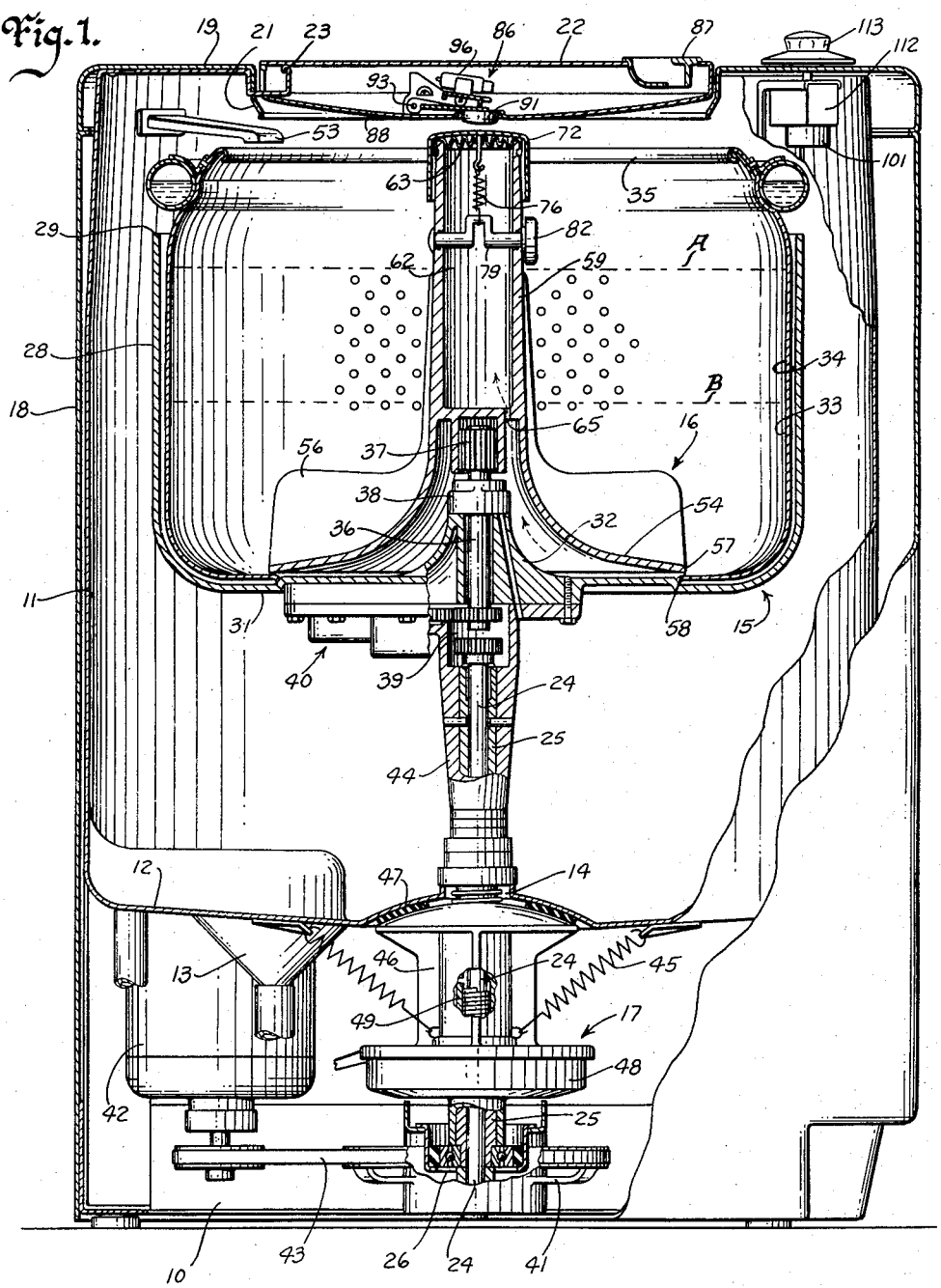
Figure 1 is a partial vertical longitudinal sectional view of the washing machine incorporating the improved liquid level responsive means.

Referring now more in detail to the drawings for one form of an automatically operated combined washing and drying machine of the vertical axis type, embodying a control mechanism including adjustable liquid level responsive means made in accordance with the present invention, there is shown a base structure 10 which provides a support for an outer stationary container or tub 11, having a bottom wall 12 with a drain opening 13 and a central crowned opening 14 therein, a support for a rotatable inner receptacle or tub 15, mounted for rotation about a vertical axis and having and oscillatory agitator or washing device 16 disposed therein, as well as a support for mechanism, generally referred to as 17, for operating the agitator for the washing operation and for rotating the tub in a washing cycle as will be hereinafter more fully described.

Enclosing the above mechanism and secured to the base 10 is a cabinet 18 which includes a top or cover panel 19 formed with an opening 21 to permit access to the inner rotatable tub 15 and it is normally closed by a two piece hollow lid or closure 22, having one side hinged at 23 to the top panel to pivot about a horizontal axis.

Extending through the crowned opening are vertical coaxial shaft means in the form of a rotatable inner shaft 24 and a rotatable outer tubular shaft 25 whose lower end is mounted in a combined radial and thrust bearing 26 carried by the base 10, and whose upper end supports the rotatable inner tub 15 within and at the upper portion of the outer tub 11 for lateral movement.

The inner rotatable tub 15 includes an outer substantially imperforate cup-shaped portion having a substantially vertical sidewall 28 terminating in a top edge 29 disposed above the normal liquid level A desired for washing and a generally horizontal bottom wall 31 formed with a centrally disposed upwardly extending hub 32, and an open ended cylindrical basket 33 having a lower perforate portion 34 disposed in substantially parallel relation to the imperforate portion to provide a small space therebetween for free flow of the washing liquid out of the receptacle and over the top edge 29 when it is rotated. The basket is secured to the imperforate portion in any suitable manner and its upper portion is imperforate and extends upwardly and inwardly above the top edge 29 terminating to define an opening 35 disposed in alignment with the opening 21 in the cover.

Projecting through and upwardly from the hub 32 is a vertically disposed oscillatory shaft 36 splined to a mating hub 37 on the agitator 16 for actuating or oscillating the same about a vertical axis to agitate the material and water therein. Any suitable sealing means 38 may be utilized between the hub 32 and the shaft 36 to provide a fluid tight joint.

Means for oscillating the agitator 16 are provided by suitable mechanism generally indicated at 39 which, in this construction is carried in a gear housing 40 secured to the bottom of the rotatable tub 15 to increase the mass thereof. This oscillating mechanism is preferably directly operated by the inner rotatable shaft 24 which has a driven pulley 41 secured thereto at its lower end, the same being continuously rotated in one direction by a motor 42 through means of a belt 43. The gear housing 40 is further provided with a downwardly projecting hub portion 44 concentric with the shaft means and is rigidly secured to the upper end of the outer tubular shaft 25.

Since the combined radial and thrust bearing 26 provides the sole support for the rotatable tub which is free to tilt thereabout, centering means in the form of a plurality of oppositely disposed springs 45 are provided to maintain the tub in a substantially vertical position. These springs are disposed at an angle to provide a component of force axially of the shaft means in addition to the centering means, and each has one of their ends connected to the bottom 12 of the stationary tub 11 and their opposite ends are connected to a damper housing 46 journalled on and concentric to the outer shaft 25 and disposed adjacent to and beneath the bottom of the stationary tub. The damper housing includes friction material 47 adapted to engage the crowned portion of the stationary tub to reduce the amplitude of movement of the rotating tub during the extraction operation.

A brake mechanism 48 also carried by the damper housing 46 is secured in part to the stationary tub 11 and the outer shaft 25 and holds the receptacle 15 stationary during the washing operation and permits its rotation by the shaft means during the spinning operation. The operation of both the brake and a clutch 49 is under control of a solenoid 50 (Figure 7) which when deenergized applies the brake and renders the clutch inactive and when energized releases the brake and engages the clutch to connect the inner and outer shafts 24 and 25, respectively, together to drive the same in unison.

A clutch centering means, brake and damper mechanisms as suitable for effecting the above operation are described in my co-pending application, Serial No. 66,230, filed December 20, 1948, now Patent No. 2,645,108, issued July 14, 1953, and assigned to the assignee of the present invention. It is to be understood, however, that said application discloses but one form of such mechanisms suitable for operating the washing machine as herein disclosed and that other suitable types may be utilized.

Hot and cold washing liquid or water are supplied from suitable conduits to a thermostatically controlled mixing valve 51 which delivers the water to proper temperature into a conduit 52 connected to an inlet nozzle 53 for discharging the same into the rotatable receptacle through its upper open end 35.

The agitator 16 disposed within the inner tub 15 is formed with an imperforate flaring base or body portion 54 extending downwardly and outwardly over the hub 32 to underlie the clothes, and has one or more blades 56 extending radially upwardly and outwardly from the upper portion of the base adapted to agitate the liquid within the tub upon oscillation of the agitator for effecting the washing operation. The lowermost portion of the base terminates in a peripheral bead 57 disposed closely adjacent the bottom wall 31 of the rotatable tub 15 which defines a circumferential opening 58 providing communication between the interior of the agitator and surrounding tub.

The body portion 54 of the agitator is provided with an upwardly extending hollow cylindrical center post or pedestal 59 disposed on the vertical axis of the tub which terminates in an upper open end 61 above the normal liquid level. The hollow interior of the agitator provides an inner chamber or compartment defining an air chamber 62 with the upper end 61 enclosed or sealed by means of a flexible imperforate member or diaphragm 63. The splined hub portion 37 of the agitator divides the air chamber into upper and lower compartments. The cylindrical upper compartment defined by the center post communicates with the interior of the lower compartment or portion of the agitator through a suitable restricted orifice or opening 65 which extends through the partition to one side and substantially parallel with the splined hub. This orifice is preferably of such dimension as to prevent any rapid or transient pressure fluctuations that may occur at the lower portion of the agitator, due to its oscillation, from being transferred to the upper air compartment. All relatively slow changes in air pressure would not be affected to any great extent. In this design the entire surface of the body portion 54 of the agitator exposed to the liquid is imperforate so that the only way water can enter the interior portion of the agitator is at the circumferential space 58 provided below its lower outermost edge 57, and its entrance is restricted by the air trapped therein.

The flexible diaphragm 63 at the upper open end 61 of the center post 59 is formed from rubber or the like and comprises a central portion 66 having annular corrugations to permit flexing and vertical movement of the same, and an outer annular downwardly directed ring portion 67 adapted to cover the upper end 61 of the center post. The ring terminates in an enlarged bead 68 snugly fitting into an outwardly opening annular recess disposed adjacent its upper end to provide a fluid tight seal. Covering the flexible diaphragm is an inverted cup-shaped member or cap 71 having an upper flat horizontal abutment engaging surface 72 and a cylindrical sidewall 73 which covers the diaphragm and loosely fits over the top of the center post.

Projecting downwardly from the center of the cap 71 is a bar or rod 74 which extends through a central opening 75 in the diaphragm in a fluid tight manner and the lower end thereof is adapted to receive the upper end of a tension spring member 76. The opposite or lower end 77 of the spring is slidably secured or engaged to an eccentric 78 formed on a rotatable shaft member 79. This shaft member projects through oppositely disposed openings 81 in the cylindrical wall 59 of the center post and one of the outer ends is provided with knob or the like 82 which is adapted to be grasped by the operator and manually rotated or indexed to one of a multiplicity of positions. The eccentric portion 78 of the shaft 79 is adapted, when rotated through an arc, to vary the downward loading on the cap 71 for reasons to be hereinafter described.

In addition, suitable sealing means 83 such as an O-ring or the like may be mounted on the shaft where it projects through the walls to provide a fluid tight seal. If desired, a series of recesses may be provided in the wall of the center post to receive a spring pressed detent 84 to hold the knob in the desired position. Suitable indicia may be provided adjacent the periphery of the knob to inform the operator of the setting or loading on the diaphragm.

In the washing machine as herein disclosed, the hollow lid 22 in the cover panel 19 provides a chamber or compartment for a plurality of switch assemblies or devices 86, constituting a part of control mechanism, and includes a recessed handle or grip device 87 which can be readily grasped by the operator to swing the lid into and out of its closed position. The base or lower wall section 88 of the lid is provided with an aperture 89 through which a downwardly directed control button 91 for the switch assembly 86 loosely projects directly above and preferably in alignment with the cap 71 at the top of the center post 59. This control button is secured adjacent one end of a lever 92 which is horizontally pivoted at its opposite end to a pin 93 carried by the lower wall section. A tiltable bracket 94 mounted above the lever on a horizontal pivot 95 provides a pivotal support for a pair of control means or switches 96 and 97, respectively, of the mercury type. This bracket is movable about its pivot by the lever 92 when the same is moved or elevated by the liquid level responsive diaphragm 63.

The mercury switches are preferably mounted so their longitudinal axes are generally in a horizontal plane and have their contacts 98 and 99, respectively, oppositely disposed, as more clearly shown in Figure 7 of the drawings. As shown in Figures 1 and 2, the button 91 is in its lowermost position indicating that the receptacle is empty or that the liquid is at such a low level as to be ineffective to raise the pressure responsive diaphragm 63. Under such circumstances, the contacts 98 in the switch 96 are bridged by the mercury contained therein, whereas the contacts 99 are not bridged by the mercury in the other switch 97. However, upon the water level reaching a predetermined level in the tub, the diaphragm 63 is elevated by the increased air pressure developed by the head of the liquid acting therein and the button 91 is engaged by the cap 71 covering the diaphragm and the lever is raised upwardly. This upward movement of the lever causes the bracket 94 to pivot about its pivot to the position whereby the mercury in the first switch 96 is moved to the end opposite the contacts 98 to open the circuit to interrupt the flow of water to the tub and the mercury within the other switch 97 is moved to bridge the contacts 99 therein and to energize a timer motor 101 and the main driving motor 42.

Since the pressure developed in the air chamber 62 is in proportion to the level of liquid acting on the air column and in order to vary the level of liquid within the tub in accordance with the quantity of fabrics to be washed to provide for more economical use of hot water and detergent, means are provided for loading or biasing the cap 71 in a downward direction toward the top of the center post 59 to oppose the normal upward movement of the diaphragm 63. As shown, the tension spring 76 resiliently connecting the cap 71 and eccentric 78 provides this force. When the eccentric is at the upper end of its arc a minimum downward spring loading is applied to the cap 71 which corresponds to the low fabric load in the washing machine, thus the switch assembly will be actuated by movement of the diaphragm at a relatively low level of liquid to initiate the washing operation. In this manner a saving of both hot water and detergent is realized for the washing operation, plus a water saving for the rinsing operation. As the eccentric 78 is rotated downward by the movement of the knob 82 the downward spring loading on the cap is increased so that a proportionately higher level of liquid is required within the tub to develop enough pressure in the air column to actuate the switch assembly for the washing operation.

Assuming water is being admitted to the tub, as soon as the level of liquid rises above the lower peripheral bead 57 of the agitator all of the air within the confines of the interior of the agitator is trapped because the body portion 54 of the agitator 16 is imperforate and its upper open end is sealed by the diaphragm 63. From this point any increase in the liquid level within the tub results in an increase in the head of liquid which in turn acts to compress the air in the column 62 a like amount. This increased pressure is applied equally throughout, is transferred through the orifice 65 and acts against the lower side of the diaphragm to move its central portion 66 vertically. As the liquid level continues to increase, the pressure acting against the diaphragm increases a like amount until it reaches a point where it overcomes the gravitational weight of the cap 71, internal resistance of the diaphragm 63 and the loading of the spring 76, after which, any increase in liquid level results in a vertical upward movement of the cap and diaphragm. Toward the upper limit of the diaphragm travel the top surface 72 of the cap 71 engages the downwardly directed button 91 on the the lever 92 and elevates the same. Such action tilts the bracket 94 to actuate the switch assembly 86 as previously described.

In the disclosed design the force required to move the switches is not great and since the pressure developed in the air column is in direct proportion to the level of liquid within the tub, it can be seen that by properly proportioning the area of the diaphragm and the spring loading it can be made to respond at a relatively low level B of liquid to actuate the switches to initiate the washing operation for low fabric loads. Thus, the diaphragm responds to a low minimum level corresponding to the low or small fabric loads, and the adjustable spring means 76 is provided to proportionately counteract the force of the air pressure developed to delay operation of the switch assembly until higher liquid levels are reached in the tub corresponding to use for larger quantities of fabrics to be washed. When the eccentric 78 is moved to the lower end of its travel corresponding to the normal wash load, the spring loading on the cap and diaphragm is such that it will require the maximum liquid level in the tub to actuate the switches for the washing operation. It is obvious that with an arrangement of this type the level of liquid within the tub may be infinitely varied from low to the normal full load value by merely rotating the knob 82 to the desired position.

In operation, the operator determines if the amount of clothing or fabrics to be washed is equivalent to a full load or somewhat less whereupon the lid 22 is elevated and the control knob 82 on the side of the center post 59 is shifted or rotated to the position corresponding to the load or weight of the material to be washed. This would be in any position between low and normal loads. Such action will automatically apply the proper spring loading on the cap 71. The material to be washed is then placed in the rotatable receptacle 15 through the opening 21, including with it the proper quantity of detergent, and the lid is closed. Thereupon the operator decides whether to use "hot" or "warm" water for the washing operation and adjusts a water temperature control knob 102, as shown in Figure 7, to position a movable bridging contact 103 in an electrical circuit 104 to either engage a hot water contact 105 in a circuit 106 to energize a hot water valve solenoid 107 or to bridge contact 105 with a warm water contact 108 to simultaneously energize the warm water valve solenoid 109 through a parallel circuit 110, when the appropriate cams 111 on the drum controller 112 are advanced to complete the circuit from the line $L_1$—$L_2$. For example, if the operator desires to use hot water, the adjustable contact 103 is moved into engagement with the hot water contact 105 and the circuit 106 is conditioned for operation.

Next, the operator grasps a timer control knob 113 and turns the same to the desired washing period to properly position the drum controller 112 and closes the main line switch 114 which conditions a timer motor 101 and the drive motor 42 for operation. Upon turning the timer control knob 113, the hot water side of the thermostatically controlled valve is actuated and conducts water at the proper temperature to the receptacle through the inlet nozzle 53. As the level of water passes above the lower peripheral bead 57 of the agitator 16, air is trapped within the confines of the agitator and this air pressure prevents the entrance of water thereunder. As the liquid level increases within the tub the pressure developed by the increasing head of liquid acts against the air in the column 62 and compresses the same. This increased pressure reacts upon the underside of the diaphragm 63 and tends to move it vertically upward.

When the level of liquid attains a predetermined value and produces a static head equal to the desired level, the increased pressure within the air column 62 will move the cap 71 upwardly against the force of gravity and the tension of the spring 76 and with continued upward movement the cap contacts the downwardly projecting button 91 to tilt the pair of mercury switches 96 and 97, respectively, as previously described. When this occurs the contacts in the mercury switch 97 are bridged to energize the timer motor 101 and the main drive motor 42 through its control circuit and appropriate cams to start the washing operation by oscillating the agitator 16 through the oscillating mechanism 39 and to advance the cams 111 in the timer. Shortly thereafter the switches are tilted still further by an increase in liquid level and the contacts in the switch 96 are opened to deenergize the water supply circuit and cut-off the flow of water to the receptacle, at which point the proper selected quantity of water for the washing operation has been introduced into the tub.

After a predetermined period of agitation in the washing cycle, the timer, through its advancing cams, completes a circuit 115 which energizes the brake solenoid 50 to release the brake 48 holding the receptacle from rotary movement and at the same time causes the clutch 49 to be engaged to directly connect the continuously rotated inner drive shaft 24 to the hollow rotatable outer shaft 25 to rotate the tub carried thereby. Upon rotation of the tub a major portion of the washing liquid is extracted from the materials in the tub and discharged over its top edge.

At the end of the extraction operation a cam de-energizes the timer and drive motors and the brake solenoid 50 which applies the brake and releases the clutch to stop and hold the tub stationary. Simultaneously with this action the warm water valve is energized by its cam through a circuit 116 and warm water is admitted to the tub. Upon attaining the proper level therein as determined by the operator in initially adjusting the level for the wash water, the switches are tilted in a manner identical to that previously described to again energize the timer and drive motors and interrupt the supply of liquid to the receptacle and to initiate the agitator rinse period. The operation of the washing machine during the agitating rinse period is identical to the operation thereof during the initial washing period, except that it is of shorter duration, after which the tub is again rotated as above described to remove the rinse water from the materials being washed.

At the end of the final extraction operation, the timer motor 101 is de-energized simultaneously with the drive motor 42, the brake solenoid 50 is de-energized to re-apply the brake 48 to the tub to stop the same. The washing cycle is now completed and the operator need only raise the lid 22 and remove the fabrics from the tub. Should the next batch of clothing or fabrics require more or less washing water the operator merely adjusts the control knob 82 on the side of the center post 59 to the proper position and the washing cycle will be repeated in a like manner when the selected liquid level has been attained.

Referring now to Figure 4, there is shown a slightly modified arrangement for a variable liquid level control. Since like parts are given like reference characters and the apparatus operates switch mechanism in an identical manner, a further detailed description of these elements is not deemed necessary. In this modification, the upper end of the center post 59 is provided with an enlarged recessed portion 117 adapted to receive an adjustable liquid level assembly 118. This assembly includes an outer cylindrical wall 119 closely fitting within the recessed portion 117 with its upper edge terminating adjacent the upper end 61 of the center post. The cylindrical wall 119 is creased to provide an inner annular shoulder 121 and an outer annular groove which is adapted to hold an O-ring sealing element 122 to provide a fluid tight seal between the cylindrical wall and center post. At the upper end of the cylindrical member 119 there is provided a flexible diaphragm 123 having an annular corrugated central section 124 and an outer peripherial bead 126 bonded to the cylindrical member to provide a fluid tight seal.

Loosely embracing the upper end of the center post and covering the diaphragm is a rotatable cap 127 having an upper generally horizontal wall 128 and a downwardly directed cylindrical sidewall of skirt 129. A rod or pin 131 is rigidly secured to the lower side of the central portion of the cap and projects downwardly through a central hub portion 132 in the diaphragm 123 and is rotatable with respect thereto with the cap. The hub 132 engages the pin to provide a fluid tight seal and relative axial movement between the two is prevented by means of a suitable shoulder 133 on the pin which fits within a recess in the hub. The lower end of the pin 131 is threaded through a suitable disc member 134 whose relative vertical position with respect to the cap 127 may be changed upon rotation of the cap in either direction while its rotation may be prevented by means of lug 136 slidably engaging a slot 137 in the stationary cylindrical wall 119.

In order to vary the loading on the diaphragm 123 to modify the air pressure at which it responds, a compression spring 138 is disposed between the outer edge of the disc 134 and annular shoulder 121 on the cylindrical wall 119. In this manner when the cap 127 is rotated to the position where a minimum compression is applied to the diaphragm 123 by the spring through the pin and cap, the diaphragm will respond and move vertically at relatively low liquid levels to initiate the washing operation. However, as the cap is rotated in the other direction the compression on the spring is increased, thus the pressure applied to the diaphragm through the cap is increased, which in turn requires higher levels of liquid in the tub before the diaphragm is elevated by the air pressure in the air column to engage and actuate the switch assembly 86. In operation this adjustable control is identical to that previously described.

In Figures 5 and 6 there is shown a slightly modified arrangement wherein the flexible diaphragm 140 is similar to that described in the first modification, however, no central opening is provided. In this instance, the central section 141 is imperforate, and the means for modifying the air pressure at which the diaphragm responds to actuate the switch assembly 86 is provided by means of a plurality of removable differently weighted cap members (142 in Figure 5 and 143 in Figure 6) which loosely fit over the upper end 61 of the center post. Each weight includes a cylindrical skirt 144 and the weight of each is so proportioned that they load and prevent movement of the diaphragm and thus contact with the control button 91, until a pressure has been developed in the air chamber 62 corresponding to the definite selected liquid level within the tub. In this manner, the liquid level may be selectively modified by the operator merely changing the caps covering the diaphragm.

It is to be understood that the particular form of the diaphragm and loading means for varying the liquid level has been shown only by way of example and that other details of construction may be applicable equally as well.

An important consideration in all of the embodiments is that when a fluid pressure responsive diaphragm is utilized as disclosed, the air trapped within the confines of the agitator is sufficient to prevent the level of liquid from raising appreciably therein, even during the washing operation when the agitator is being oscillated. In this manner it can be seen the water is kept away from the agitator shaft 36 and the seal 38 and that grease and the like are not removed from the shaft by the detergent and mixed with the wash water. Also, the splined upper end 37 of the shaft 36 is not operated in the water or washing solution nor can sedimentary material collect between the mating splines and render the agitator difficult to remove. This eliminates a troublesome problem. Another important consideration is that with an increased air pressure within the column 62 should the seal 38 have a tendency to leak any leakage will be air and in such direction as to oppose upward movement of the grease from the gear housing.

In a construction of this type wherein a single rotatable tub construction is mounted for lateral movement with respect to surrounding apparatus, a simplified control means has been provided whereby the liquid level sensitive mechanism carried directly by the laterally movable tub is so proportioned that it is capable of engaging associated control apparatus carried by the stationary portion of the washing machine in any offset position the tub may assume, within the design limits of the machine.

From the foregoing it can be seen a simplified adjustable pressure responsive mechanism has been provided for selectively varying liquid levels for an automatic washing machine which is readily accessible to the operator for manipulation to accommodate varying amounts or weights of fabrics by using proportionately smaller or larger quantities of water to thereby provide for a more economical operation thereof when less than the normal amount of clothes is to be washed.

In addition, a simplified means for selectively varying the liquid level in a washing machine tub has been provided which is readily accessible for operation, inspection or repair, if needed, and at the same time the means for operating the switches also prevents contact of the wash water with the oscillating shaft and spline to prevent contamination of the lubricant in the gear housing by water should a leak occur.

This application is related to application Serial No. 373,956, filed August 13, 1953, and Serial No. 374,024, filed August 13, 1953, both of which are assigned to the same assignee.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. In a washing machine having a liquid receiving container, an agitator having a hollow center post for holding air under compression as said container is filled with liquid, a movable control member adjacent said agitator, said center post including a pressure responsive diaphragm movable toward said control member to actuate said control member when air is compressed within said hollow center post, means for biasing said diaphragm away from said control member, and manually operable means controlling the degree of bias exerted by said last named means to increase the amount of air pressure necessary to move said diaphragm towards said control member.

2. In a washing machine having a liquid receiving container, an agitator having a hollow center post for holding air under compression as said container is filled with liquid, a control member adjacent said agitator, a pressure responsive diaphragm on said center post controlling said control member, means biasing said diaphragm away from said control member, a crank on said center post regulating the bias exerted by said last named means, and detent means resisting movement of said crank.

3. In a washing machine having a liquid receiving container, an agitator having a hollow center post for holding air under compression as said container is filled with liquid, a movable control member adjacent said agitator, a rotatable cap on said center post controlling movement of said control member, a flexible diaphragm responsive to changes of air within said center post mounted between said cap and said center post, a threaded member depending from said cap through said diaphragm, a nonrotatable threaded member inside said center post cooperating with said depending threaded member and movable toward and away from said cap by rotation of said cap, and resilient means biasing said cap away from said control member and resisting movement of said nonrotatable member towards said cap.

References Cited in the file of this patent

UNITED STATES PATENTS

| | | |
|---|---|---|
| 2,471,778 | Ringer | May 31, 1949 |
| 2,583,077 | Arney | Jan. 22, 1952 |
| 2,592,314 | Morton | Apr. 8, 1952 |
| 2,635,445 | Smith | Apr. 21, 1953 |
| 2,635,446 | Smith | Apr. 21, 1953 |
| 2,656,431 | Bochnan | Oct. 20, 1953 |